Figure 1:
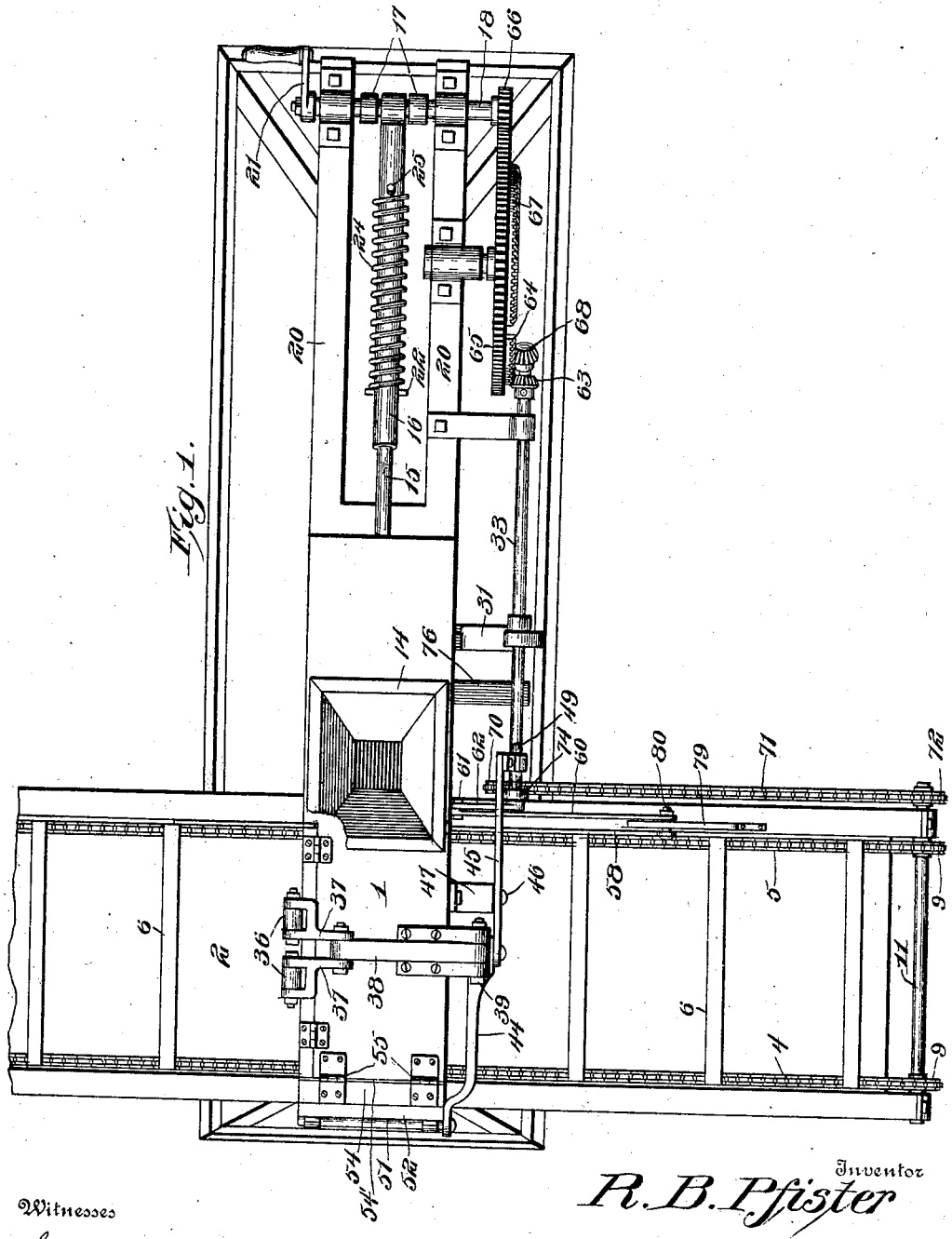

No. 833,625. PATENTED OCT. 16, 1906.
R. B. PFISTER.
BRICK MACHINE.
APPLICATION FILED APR. 17, 1906.

4 SHEETS—SHEET 1.

Witnesses
Louis R. Heinrichs
R. M. Smith

Inventor
R. B. Pfister
By Victor J. Evans.
Attorney

No. 833,625. PATENTED OCT. 16, 1906.
R. B. PFISTER.
BRICK MACHINE.
APPLICATION FILED APR. 17, 1906.
4 SHEETS—SHEET 2.
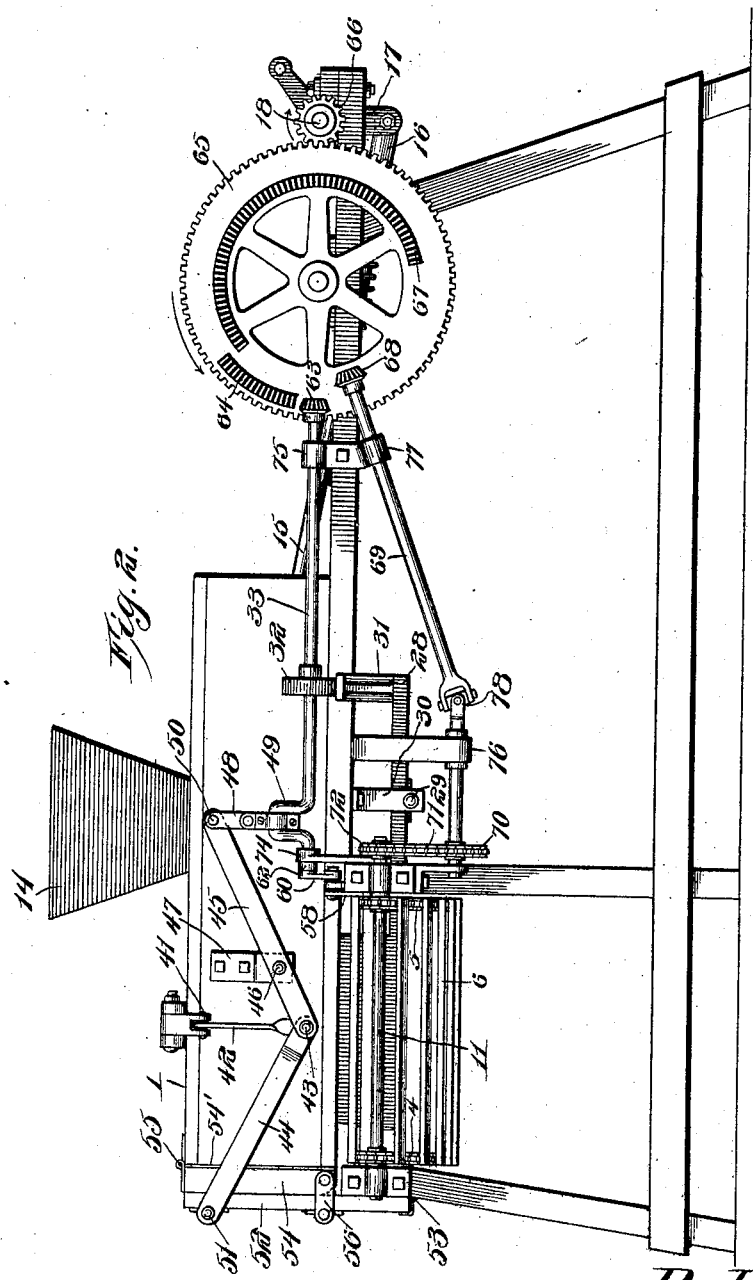
Witnesses
Louis R. Heinrichs.
R. M. Smith.
Inventor
R. B. Pfister
By Victor J. Evans.
Attorney No. 833,625. PATENTED OCT. 16, 1906.
R. B. PFISTER.
BRICK MACHINE.
APPLICATION FILED APR. 17, 1906.
4 SHEETS—SHEET 3.
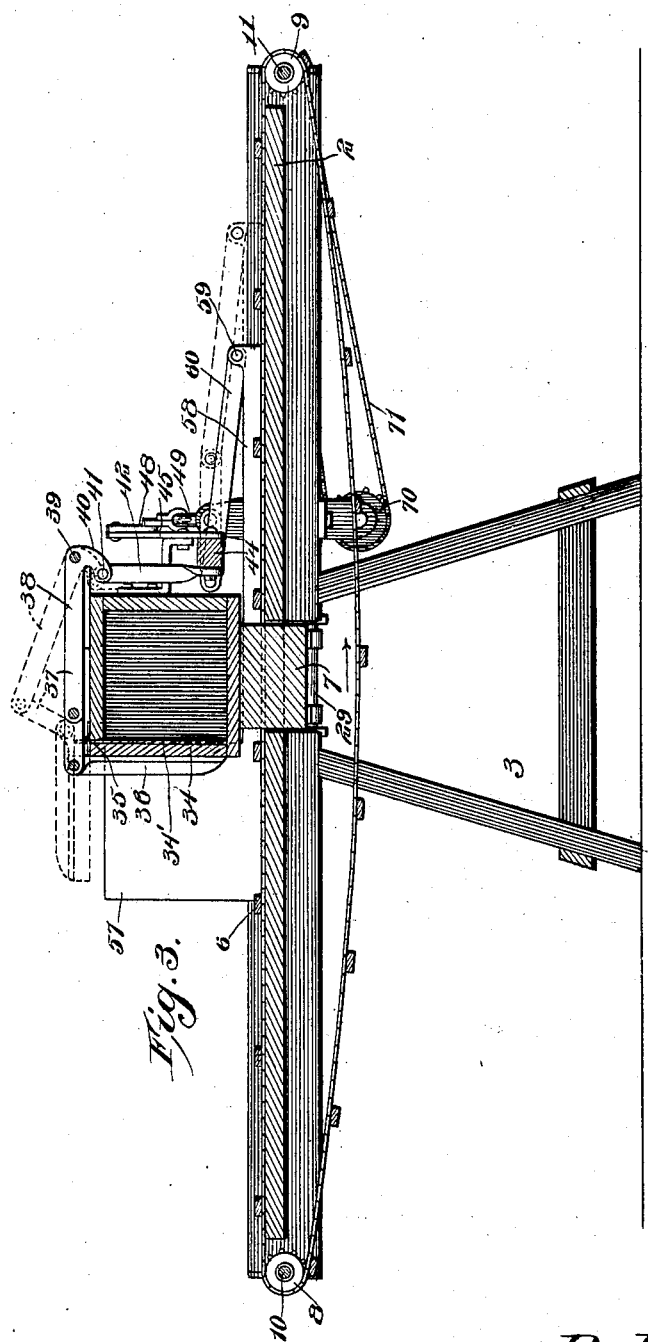
Witnesses
Inventor
R. B. Pfister
By Victor J. Evans.
Attorney No. 833,625. PATENTED OCT. 16, 1906.
R. B. PFISTER.
BRICK MACHINE.
APPLICATION FILED APR. 17, 1906.
4 SHEETS—SHEET 4.
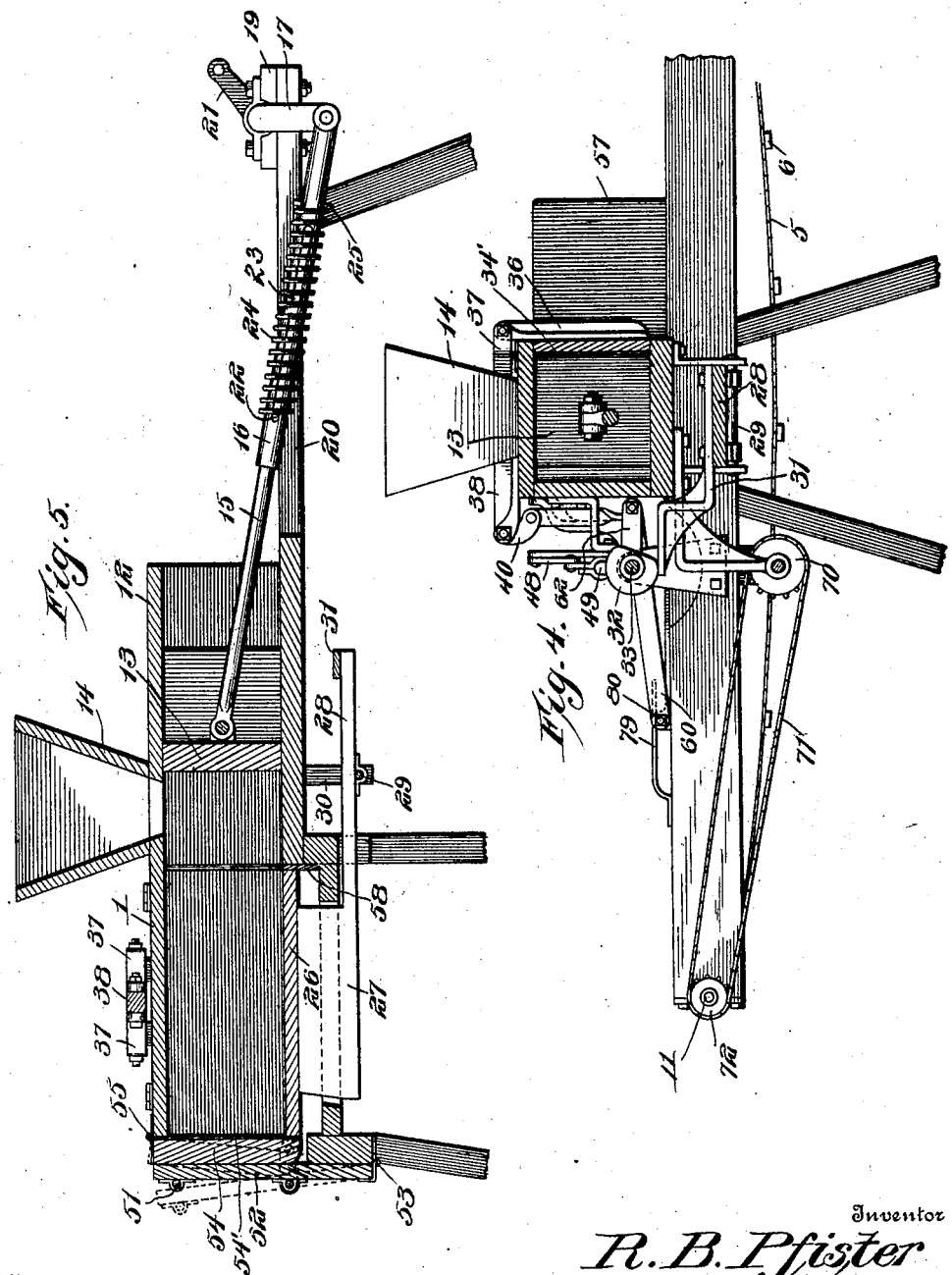
Witnesses
Louis R. Heinrichs.
P. M. Smith.
Inventor
R. B. Pfister
By Victor J. Evans.
Attorney

UNITED STATES PATENT OFFICE.

ROBERT B. PFISTER, OF GREAT BEND, KANSAS.

BRICK-MACHINE.

No. 833,625.      Specification of Letters Patent.      Patented Oct. 16, 1906.

Application filed April 17, 1906. Serial No. 312,197.

*To all whom it may concern:*

Be it known that I, ROBERT B. PFISTER, a citizen of the United States, residing at Great Bend, in the county of Barton and State of Kansas, have invented new and useful Improvements in Brick-Machines, of which the following is a specification.

This invention relates to brick-machines, the object of the invention being to provide a simple brick-machine which may be either operated by hand or power and which will tamp the material and compress the same in a mold-box, mechanism being provided for cutting off the column of material, opening up the box to admit of the brick being discharged therefrom, means for carrying away the molded brick and moving another pallet into place to support the succeeding brick, the several mechanisms being properly timed relatively to each other and operating automatically.

With the above and other objects in view, the nature of which will more fully appear as the description proceeds, the invention consists in the novel construction, combination, and arrangement of parts hereinafter more fully described, illustrated, and claimed.

In the accompanying drawings, Figure 1 is a plan view of a brick-molding machine embodying the present invention. Fig. 2 is a side elevation of the same. Fig. 3 is a cross-section through the mold-box and lengthwise of the table and carrier looking toward the rear end of the machine. Fig. 4 is a cross-section similar to Fig. 3 looking toward the opposite end. Fig. 5 is a vertical longitudinal section through the mold-box.

By reference to Fig. 1 it will be seen that the machine comprises a mold-box 1 and a table 2, extending at right angles to the mold-box. This table is supported by a suitable stand 3 at the desired elevation and is equipped with a carrier embodying opposite parallel chains 4 and 5, connected at suitable intervals with cross-cleats 6, leaving spaces between the chains and cleats sufficient in size to permit the pallet-support 7 to move upward and downward between the same, as indicated in Fig. 3. The upper run of the carrier slides upon the upper surface of the table 2, while the lower run thereof extends lengthwise of and beneath said table, the chains of the carrier passing over sprocket-wheels 8 and 9 on shafts 10 and 11, arranged at opposite ends of the table 2, as shown in Fig. 3, the last-named shaft 11 constituting the driving-shaft of the carrier.

The mold-box 1, as previously indicated, extends transversely of the table 2 and considerably to one side thereof to form a tamping-chamber 12, in which is mounted a reciprocating tamper or tamping-block 13, which operates beneath the discharge end of a superimposed hopper 14, in which the clay or cement mixture composition is placed and by means of which it is fed into the tamping-chamber and advanced and compressed by the tamping-block 13 in the mold-box 1. Connected to the tamper 13 is a pitman embodying relatively slidable telescopic members 15 and 16, one of said members being pivotally connected to the tamper 13, as shown in Fig. 5, while the opposite end of the other member is connected to and operated by a crank 17 on the main driving-shaft 18, which is mounted in suitable bearings 19 on the longitudinally-extended bars 20 of the machine-frame.

The shaft 18 is provided with driving means 21, shown in the form of a hand-operated crank; but it will be understood that power may be applied to the driving-shaft 18 in any desired manner either by hand or from a suitable motor. The member 15 of the pitman is adapted to slide in the member 16 and is provided with a guide and stop-pin 22, which works in a guide-slot 23 in the member 16, while a spiral spring 24 is disposed around the outer member 16 and held between a shoulder 25 on the outer member 16 and a corresponding shoulder on the inner member 15, which may consist of the pin 22. The construction just described permits the pitman to automatically shorten itself to agree with the throw of the tamper 13 according to the quantity and density of the material in the mold-box and tamping-chamber.

The bottom of the mold-box is open, and a pallet 26 is held within the open bottom of said box by means of a pallet-support 27, which is in turn held in place by means of a lever-arm 28, fulcrumed at 29 on a hanger 30, extending downward from the machine-frame, the lever-arm 28 being provided with a foot 31, which extends upward and is operated upon by a cam 32, carried by a shaft 33, extending parallel with the mold-box 1, said cam acting upon the foot 31 to rock the lever-arm 28 and correspondingly raise and lower the pallet-support 27 and the pallet 26 carried thereby. When the pallet is raised by the pallet-support, it forms, in effect, the bottom of the mold-box, being held in line with the bottom of the tamping-chamber 12, as shown in Fig. 5. The pallet 26 is held in this position during the tamping operation. When the pallet is lowered by the mechanism just described, said pallet rests on the table 2. The pallet is lowered upon the table 2 just before motion is imparted to the carrier, and as the carrier starts to move one of the cleats 6 thereof takes up the pallet and moves the same out from beneath the mold-box, thus carrying the brick away.

In order to release the molded brick from the mold-box 1, the latter is provided with a side door 34, which is hinged at its upper edge, as shown at 35, so that the bottom edge thereof may swing outward and upward from the full-line position shown in Fig. 3 to the dotted-line position shown in the same figure. In order to automatically open and close said door, the latter is provided with an upwardly-extending arm 36, connected by links 37 to the long arm 38 of an elbow-lever, the latter being fulcrumed at 39 and the short arm 40 thereof being connected pivotally at 41 to the upper end of a link 42, the lower end of which is connected to the pivot 43, which connects the adjacent ends of a pair of toggle-levers 44 and 45, the lever 45 being fulcrumed at 46 on a bracket 47 at one side of the mold-box and having its opposite outer end connected by a link 48 to a crank 49 on the intermittently-operated shaft 33, hereinabove referred to. The connection at the point 50 between the lever 45 and the link 48 is of such a nature as to permit the lower end of the link to follow the movement of the crank 49.

The outer end of the other lever 44 is pivotally connected at 51 to the upper end of an end-door-operating lever 52, the lower end of which is pivoted or hinged at 53 to the machine-frame. The end door 54 of the mold-box is hinged to the box at its upper edge at the point 55, so that the lower end thereof may swing outward and upward, as indicated by dotted lines in Fig. 5, and the lower portion of said end door 54 is connected to the lever 52 by one or more links 56. It will be seen that as the inner end of the lever 44 is raised by the lever 45 the outer end of the lever 44 pushes outward on the upward end of the lever 52, causing the links 56 to draw the lower edge of the end door 54 outward, which relieves the end pressure on the molded brick in the mold-box 1. The releasing of the end door is simultaneous with the swinging outward and upward of the side door 34, and at the same time the pallet 26 is lowered upon the table 2 in readiness to be moved and carried off by one of the cross-bars 6 of the carrier, it being understood that the pallet-support 27 moves downward, so that its upper surface lies flush with or slightly beneath the upper surface of the table, so as not to interfere with the movement of the cross bars or cleats 6 over the same.

The opposite sides of the mold-box are slotted or grooved to receive a horizontally-reciprocating cut-off 57, which rests upon and works in contact with the table 2, said cut-off being provided with an arm 58, which extends underneath the mold-box and a considerable distance beyond the same, where it is connected pivotally at 59 to one end of a pitman 60, the opposite or inner end of which is connected at 61 to a crank 62 on the intermittently-operated shaft 33, hereinabove referred to. At the proper time the cut-off 57 moves across the inside of the mold-box and severs the column of compressed material, dividing off the brick of a proper length therefrom so that it may be discharged from the mold-box by the means hereinabove described.

The shaft 33 is provided with a bevel-pinion 63, which is intermittently operated by a brick-releasing gear-segment 64, carried by a master gear-wheel 65, which is actuated by a driving-pinion 66 on the main driving-shaft 18, as shown in Figs. 1 and 2. The segment 64 is of sufficient extent to impart one complete revolution to the shaft 33 at the proper time for releasing the brick from the mold-box. The master gear-wheel 65 is also provided with a carrier-actuating segment 67, which meshes with the bevel-pinion 68 on one end of a tumbling-shaft 69, one member of which carries a sprocket-wheel 70, from which a chain 71 passes around another sprocket-wheel 72 on the carrier-shaft 11, motion thus being imparted to the carrier and the gear-segment 67 being long enough to drive the carrier a distance sufficient to move the pallet supporting the brick just cut off and released away from the mold-box, another pallet being at the same time moved beneath the mold-box in position to be raised by the pallet-support 27 to the position shown in Fig. 5. The segments 64 and 67 are so arranged as to properly time the intermittent rotation of the shafts 33 and 69, whereby the column of material in the mold-box and tamping-chamber is cut in two by the cut-off, the side and end doors of the mold-box opened, and the pallet lowered upon the table 2. Then the carrier is actuated to move the pallet containing the brick out from the mold-box and another pallet to a position beneath the mold-box. The shaft 33 is mounted in suitable bearings 74 and 75, secured to the machine-frame, and the tumbling-shaft 67 is mounted in bearings or hangers 76 and 77, secured to the machine-frame, the tumbling-shaft 69 embodying the universal-joint connection 78.

79 designates a guide for the bolt or pivot 80, which connects the arm 58 of the cut-off to the pitman 60, which operates the cut-off.

In some cases it is desirable to provide a rock face or other ornamental face on each of the bricks and to utilize such ornamental face on either the exposed side face or the end of the brick, or both of said faces. This may be accomplished, as shown in Figs. 3 and 5, by employing additional face-plates 34′ and 54′, secured, respectively, to the side and end doors of the mold-chamber, said plates having indentations and raised portions corresponding to the roughened surface of a block of stone and being designed to impart such formation to the corresponding faces of the bricks as they are molded within the chamber of the machine. Any desired ornamentation may thus be imparted to the bricks.

I claim—

1. A brick-machine embodying a stationary mold-box, means for tamping the material therein, a pallet forming a movable bottom for the mold-box, a pallet-support, a table underlying the pallet, means for operating the pallet-support to deposit the pallet on the table, and a carrier for moving the pallet along the table to and away from the box.

2. A brick-machine embodying a mold-box, means for tamping the material therein, a table extending beneath the mold-box, a pallet forming a movable bottom for the mold-box, a pallet-support, means for actuating the pallet-support to raise and lower the pallet, and a carrier on the table for moving the pallet away from the mold-box.

3. A brick-machine embodying a mold-box, means for tamping the material therein, a table extending beneath the mold-box, a pallet forming a movable bottom for the mold-box, a pallet-support, means for actuating the pallet-support to raise and lower the pallet, a carrier on the table for moving the pallet away from the mold-box, a door forming one wall of the mold-box, and means for automatically opening said door at the time the pallet is lowered.

4. A brick-machine embodying a mold-box, means operating horizontally to tamp the material therein, an outwardly-movable side door for said box, a pallet forming a movable bottom for the mold-box, and means operating automatically to simultaneously open the said door and lower the pallet to release the brick from the mold-box.

5. A brick-machine embodying a mold-box having a movable side door and a movable end door, means operating horizontally to tamp the material in the box, a pallet forming a movable bottom for the mold-box, and means operating automatically to simultaneously open the side and end doors of the mold-box and lower the pallet.

6. A brick-machine embodying a mold-box having one or more doors, a pallet forming a movable bottom for the box, means for tamping the material in the box, a carrier operating beneath the box, a driving-shaft, and connections operated by said shaft for opening the door or doors of the mold-box, lowering the pallet and moving said pallet away from the mold-box.

7. A brick-machine embodying a stationary mold-box, means for tamping the material therein, a table extending under said mold-box, a carrier operating along said table and provided with spaced cleats or cross-bars a pallet-support movable through the spaces between the cross-cleats of the carrier and operating beneath the mold-box, and a series of pallets actuated by said carrier and adapted to be succesively carried beneath the mold-box and raised and lowered by the pallet-support to receive the bricks therefrom.

8. A brick-machine embodying a stationary mold-box having an open bottom, means for tamping the material therein, a table extending beneath said mold-box, a carrier movable along said table and comprising cleats with intervening spaces, a pallet-support movable through an opening in the table directly under said mold-box and through the openings provided by the spaces between the cleats of the carrier, means for intermittently raising and lowering the pallet-support, and a series of pallets movable with and by the carrier into and out of position beneath the mold-box and also movable upward and downward by the pallet-support, each pallet being adapted to serve as a bottom for the mold-box when elevated.

9. A brick-machine embodying a mold-box having a hinged door forming one of the vertical walls thereof, a pallet forming a movable bottom for said box, a carrier movable beneath the mold-box, a pallet-support operating beneath the box to raise and lower the pallet, an intermittently-operated shaft connected with the door-opening mechanism and the pallet raising and lowering mechanism, an intermittently-operated shaft for driving the carrier, and a master gear-wheel having gear-segments which impart intermittent motion to the aforesaid shafts, substantially as described.

10. A brick-machine embodying a mold-box, means for tamping the material therein, a cut-off movable across the interior of said box, movable walls forming parts of said box, a driving-shaft, and connections between said driving-shaft and the movable walls of the mold-box and the cut-off, whereby the material in the box is severed to form a brick and said brick released from the mold-box, substantially as described.

In testimony whereof I affix my signature in presence of two witnesses.

ROBERT B. PFISTER.

Witnesses:
A. R. FREEDEMAN,
GEO. W. THATCHER.